US012640381B2

(12) United States Patent
Yamazaki et al.

(10) Patent No.: US 12,640,381 B2
(45) Date of Patent: May 26, 2026

(54) INFORMATION PROCESSING DEVICE AND VEHICLE

(71) Applicant: HONDA MOTOR CO., LTD., Tokyo (JP)

(72) Inventors: Keiko Yamazaki, Saitama (JP); Atsushi Kamachi, Saitama (JP); Tatsuro Haruki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 533 days.

(21) Appl. No.: 18/129,401

(22) Filed: Mar. 31, 2023

(65) Prior Publication Data

US 2023/0311711 A1 Oct. 5, 2023

(30) Foreign Application Priority Data

Mar. 31, 2022 (JP) ................................. 2022-060215

(51) Int. Cl.
| | |
|---|---|
| *H01M 8/04313* | (2016.01) |
| *B60L 58/30* | (2019.01) |
| *H01M 8/04082* | (2016.01) |

(52) U.S. Cl.
CPC ......... *H01M 8/04313* (2013.01); *B60L 58/30* (2019.02); *H01M 8/04082* (2013.01); *H01M 2250/20* (2013.01)

(58) Field of Classification Search
CPC ......... H01M 8/04082; H01M 8/04313; H01M 8/0432; H01M 8/04417; H01M 8/04746
See application file for complete search history.

(56) References Cited

U.S. PATENT DOCUMENTS

| | | | | |
|---|---|---|---|---|
| 10,164,278 | B2 * | 12/2018 | Joos | .................... H01M 16/006 |
| 2009/0023040 | A1 * | 1/2009 | Paik | .................... H01M 8/0662 |
| | | | | 429/429 |

(Continued)

FOREIGN PATENT DOCUMENTS

| | | | | |
|---|---|---|---|---|
| CN | 115498216 B | * | 5/2025 | ........ H01M 8/04238 |
| JP | 2011-243477 A | | 12/2011 | |

(Continued)

OTHER PUBLICATIONS

Dec. 10, 2025, Translation of Chinese Office Action issued for related CN Application No. 202310323501.2.

*Primary Examiner* — Amanda C. Walke
(74) *Attorney, Agent, or Firm* — Paratus Law Group, PLLC

(57) ABSTRACT

An information processing device includes an acquisition unit which acquires use history information indicating a use history of the vehicle for a plurality of items, a derivation unit which derives an output decrease amount for each of the items based on the use history information and output decrease characteristic information, a factor-specific output decrease amount estimation unit which estimates the output decrease amount for each output decrease factor based on the output decrease amount for each item and output decrease factor information, and a control unit. When an output decrease amount for a predetermined output decrease factor is equal to or larger than a threshold value, the control unit executes adhering substance removal control of supplying a nitrogen-enriched gas having a higher nitrogen concentration and a lower oxygen concentration than air to the fuel cell as a cathode gas.

9 Claims, 8 Drawing Sheets

(56)     References Cited

U.S. PATENT DOCUMENTS

| | | | | |
|---|---|---|---|---|
| 2011/0195324 A1* | 8/2011 | Zhang | ................. | H01M 8/0662 |
| | | | | 429/413 |
| 2013/0059219 A1* | 3/2013 | Kimura | .................. | H01M 4/92 |
| | | | | 429/465 |
| 2013/0065150 A1 | 3/2013 | Matsusue | | |
| 2014/0154599 A1* | 6/2014 | Ha | ...................... | H01M 8/0432 |
| | | | | 429/429 |
| 2015/0125772 A1* | 5/2015 | Matsusue | ......... | H01M 8/04873 |
| | | | | 429/432 |
| 2017/0309938 A1* | 10/2017 | Murata | ............. | H01M 8/04992 |
| 2018/0097245 A1* | 4/2018 | Matsusue | ............... | H01M 8/10 |
| 2018/0215283 A1* | 8/2018 | Matsusue | ............... | B60L 58/40 |
| 2018/0226668 A1 | 8/2018 | Van Schaftingen et al. | | |
| 2023/0307676 A1* | 9/2023 | Inoue | ................ | H01M 8/04753 |
| 2023/0317982 A1* | 10/2023 | Yamazaki | ......... | H01M 8/04067 |
| | | | | 429/434 |
| 2023/0317995 A1* | 10/2023 | Yamazaki | ......... | H01M 8/04358 |
| | | | | 701/22 |

FOREIGN PATENT DOCUMENTS

| | | | | | |
|---|---|---|---|---|---|
| JP | 2014-078364 A | 5/2014 | | | |
| JP | 2014-183676 A | 9/2014 | | | |
| JP | 2020-170628 A | 10/2020 | | | |
| WO | WO 2013/128610 A1 | 9/2013 | | | |
| WO | WO-2016056618 A1 * | 4/2016 | .............. | H01M 8/04 |

\* cited by examiner

FIG. 5

INFORMATION PROCESSING DEVICE AND VEHICLE

CROSS-REFERENCE TO RELATED APPLICATION

The present application claims priority from Japanese Patent Application No. 2022-060215 filed on Mar. 31, 2022, the entire content of which is incorporated herein by reference.

TECHNICAL FIELD

The present invention relates to an information processing device and a vehicle including the information processing device.

BACKGROUND ART

In recent years, research and development on fuel cells that contribute to energy efficiency have been carried out to ensure access to convenient, reliable, sustainable, and advanced energy for more people. In addition, in recent years, as one of efforts for implementing a low-carbon society or a decarbonized society, a fuel cell electric vehicle including a fuel cell as a power source and a drive source driven by electric power of the fuel cell has been developed (for example, see JP2011-243477A and WO2013/128610).

A fuel cell deteriorates as the fuel cell is used, and thus a rated output thereof gradually decreases. Therefore, in a fuel cell system including a fuel cell as a power source of a fuel cell automobile or the like, it is desirable to perform control in consideration of a degree of deterioration of the fuel cell.

SUMMARY

An object of the present invention is to provide an information processing device and a vehicle capable of reducing an output decrease caused by deterioration of a fuel cell and ensuring an output of the fuel cell by executing control in consideration of a degree of deterioration of the fuel cell.

According to a first aspect of the present invention, there is provided an information processing device configured to predict an output decrease amount of a fuel cell in a vehicle including the fuel cell and a drive source driven by electric power of the fuel cell. The information processing device includes an acquisition unit configured to acquire use history information indicating a use history of the vehicle for a plurality of items related to an output decrease of the fuel cell, a derivation unit configured to derive the output decrease amount for each of the items based on the use history information acquired by the acquisition unit and output decrease characteristic information indicating an output decrease characteristic of the fuel cell for each of the items, a factor-specific output decrease amount estimation unit configured to estimate the output decrease amount for each output decrease factor based on the output decrease amount for each item derived by the derivation unit and output decrease factor information indicating the output decrease factor of the fuel cell for each of the items, and a control unit configured to execute predetermined control based on the output decrease amount for each output decrease factor estimated by the factor-specific output decrease amount estimation unit. When an output decrease amount for a predetermined output decrease factor among output decrease amounts for the respective output decrease factors is equal to or larger than a threshold value, the control unit executes adhering substance removal control of supplying a nitrogen-enriched gas having a higher nitrogen concentration and a lower oxygen concentration than air to the fuel cell as a cathode gas.

According to a second aspect of the present invention, there is provided a vehicle including the information processing device according to the first aspect of the invention, the fuel cell, and the drive source.

According to a third aspect of the present invention, there is provided an information processing device configured to predict an output decrease amount of a fuel cell in a fuel cell system including the fuel cell. The information processing device includes an acquisition unit configured to acquire use history information indicating a use history of the fuel cell system for a plurality of items related to an output decrease of the fuel cell, a derivation unit configured to derive the output decrease amount for each of the items based on the use history information acquired by the acquisition unit and output decrease characteristic information indicating an output decrease characteristic of the fuel cell for each of the items, a factor-specific output decrease amount estimation unit configured to estimate the output decrease amount for each output decrease factor based on the output decrease amount for each item derived by the derivation unit and output decrease factor information indicating the output decrease factor of the fuel cell for each of the items, and a control unit configured to execute predetermined processing based on the output decrease amount for each output decrease factor estimated by the factor-specific output decrease amount estimation unit. When an output decrease amount for a predetermined output decrease factor among output decrease amounts for the respective output decrease factors is equal to or larger than a threshold value, the control unit executes adhering substance removal control of supplying a nitrogen-enriched gas having a higher nitrogen concentration and a lower oxygen concentration than air to the fuel cell as a cathode gas.

According to the present invention, it is possible to provide an information processing device and a vehicle capable of reducing an output decrease caused by deterioration of a fuel cell and ensuring an output of the fuel cell by executing control in consideration of a degree of deterioration of the fuel cell.

BRIEF DESCRIPTION OF DRAWINGS

FIG. 5 is an explanatory diagram showing an effect of recovering a rated output of a fuel cell stack 12 implemented by adhering substance removal control.

DESCRIPTION OF EMBODIMENTS

Figure 1:
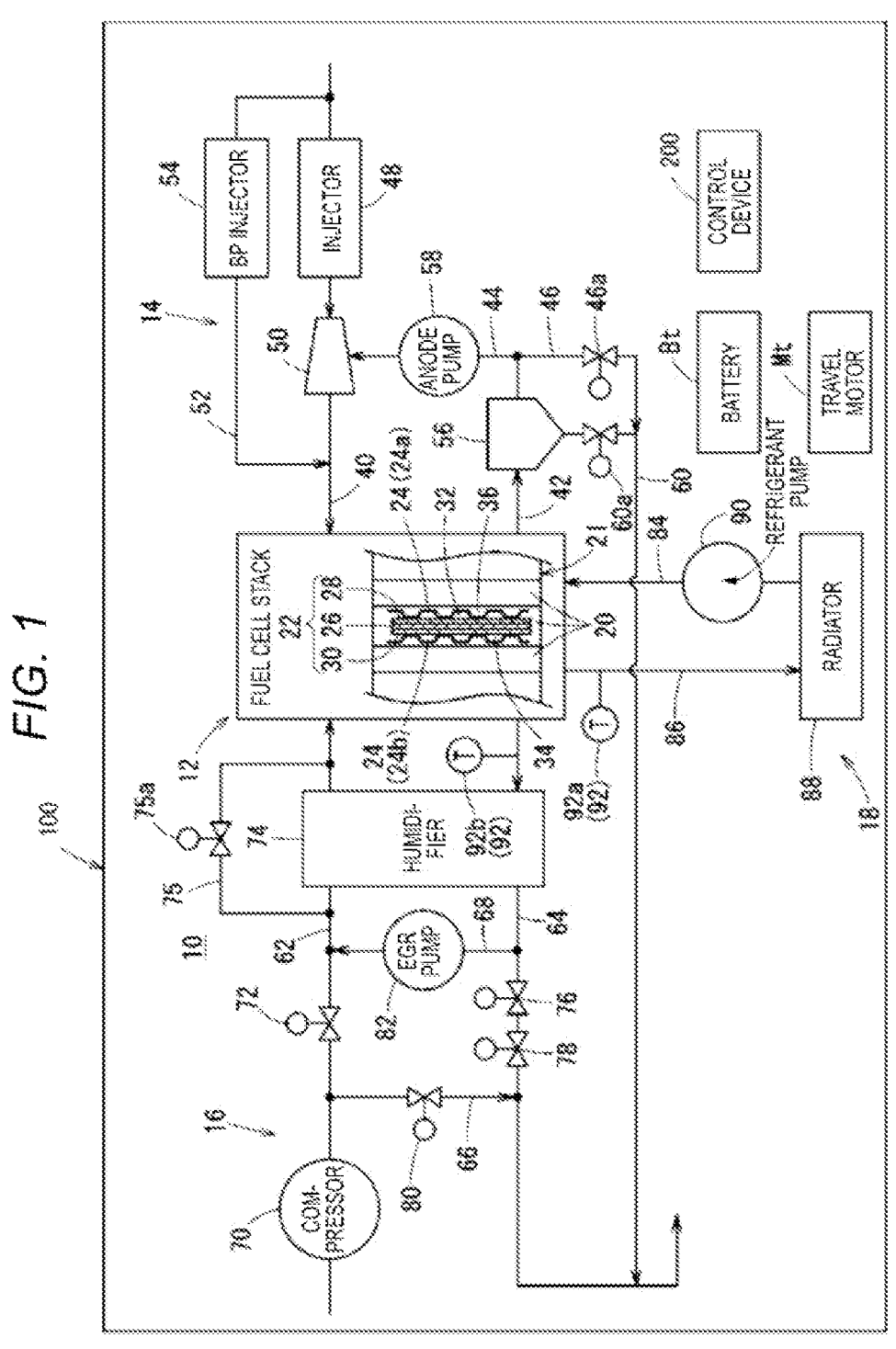
FIG. 1 is an explanatory diagram showing an overall configuration of a vehicle 100 according to an embodiment.

Hereinafter, an embodiment of an information processing device and a vehicle including the information processing device according to the present invention will be described. In the following description, the same or similar elements are denoted by the same or similar reference numerals, and the description thereof may be omitted or simplified as appropriate.

<Vehicle>

As shown in FIG. 1, a vehicle 100 according to the present embodiment includes a fuel cell system 10. The fuel cell system 10 includes a fuel cell stack 12, an anode system device 14, a cathode system device 16, and a cooling device 18. The fuel cell system 10 is mounted in, for example, a motor room of the fuel cell vehicle 100 (a fuel cell automobile, hereinafter simply referred to as the "vehicle 100"), and causes the vehicle 100) to travel by supplying electric power generated by the fuel cell stack 12 to a battery Bt, a travel motor Mt, and the like.

The fuel cell stack 12 includes a plurality of power generation cells 20 that generate electric power by an electrochemical reaction between an anode gas (a fuel gas such as hydrogen) and a cathode gas (an oxidant gas such as air). The plurality of power generation cells 20 are configured as a laminate 21 laminated along a vehicle width direction such that electrode surfaces stand upright in a state in which the fuel cell stack 12 is mounted on the vehicle 100. The plurality of power generation cells 20 may also be laminated in a vehicle length direction (front-rear direction) of the vehicle 100 or a gravity direction.

Each of the power generation cells 20 includes an electrolyte membrane and electrode structure 22 (hereinafter referred to as an "MEA 22") and a pair of separators 24 (separator 24*a* and separator 24*b*) sandwiching the MEA 22. The MEA 22 includes an electrolyte membrane 26 (for example, a solid polymer electrolyte membrane (cation exchange membrane)), an anode electrode 28 provided on one surface of the electrolyte membrane 26, and a cathode electrode 30 provided on the other surface of the electrolyte membrane 26. Although detailed description and illustration are omitted, the anode electrode 28 and the cathode electrode 30 are implemented by providing a catalyst layer and a gas diffusion layer in this order from the electrolyte membrane 26 side. The catalyst layers (hereinafter, also simply referred to as "catalysts") of the anode electrode 28 and the cathode electrode 30 include, for example, platinum particles for increasing a reaction rate of the electrochemical reaction between the anode gas and the cathode gas, and carbon that serves as a carrier supporting the platinum particles. As the fuel cell stack 12 generates electric power, sulfate ions or the like may adhere to the catalyst. Such an adhering substance to the catalyst may be one main factor of deterioration (in other words, an output decrease) of the fuel cell stack 12.

The separator 24*a* forms an anode gas flow path 32 through which the anode gas flows on the one surface of the MEA 22. The separator 24*b* forms a cathode gas flow path 34 through which the cathode gas flows on the other surface of the MEA 22. In addition, a refrigerant flow path 36 through which a refrigerant flows is formed on a surface where the separator 24*a* and the separator 24*b* face each other when laminating the plurality of power generation cells 20.

The fuel cell stack 12 further includes a plurality of communication holes (not shown) through which the anode gas, the cathode gas, and the refrigerant flow along a lamination direction of the laminate 21 (an anode gas communication hole, a cathode gas communication hole, and a refrigerant communication hole). The anode gas communication hole communicates with the anode gas flow path 32, the cathode gas communication hole communicates with the cathode gas flow path 34, and the refrigerant communication hole communicates with the refrigerant flow path 36.

The fuel cell stack 12 is supplied with the anode gas by the anode system device 14. In the fuel cell stack 12, the anode gas flows into the anode gas flow path 32 through the anode gas communication hole (anode gas inlet communication hole) and is used for power generation in the anode electrode 28. An anode off-gas (containing unreacted hydrogen) used for power generation flows out from the anode gas flow path 32 to the anode gas communication hole (anode gas outlet communication hole) and is exhausted from the fuel cell stack 12 to the anode system device 14.

In addition, the fuel cell stack 12 is supplied with the cathode gas by the cathode system device 16. In the fuel cell stack 12, the cathode gas flows into the cathode gas flow path 34 through the cathode gas communication hole and is used for power generation in the cathode electrode 30. A cathode off-gas used for power generation flows out from the cathode gas flow path 34 to the cathode gas communication hole and is exhausted from the fuel cell stack 12 to the cathode system device 16.

Further, the fuel cell stack 12 is supplied with the refrigerant by the cooling device 18. The refrigerant in the fuel cell stack 12 flows into the refrigerant flow path 36 through the refrigerant communication hole and cools the power generation cell 20. The refrigerant that cools the power generation cell 20 flows out from the refrigerant flow path 36 to the refrigerant communication hole, and is discharged from the fuel cell stack 12 to the cooling device 18.

In addition, the laminate 21 of the fuel cell stack 12 is housed in, for example, a stack case (not shown). At both ends in the lamination direction of the laminate 21, a terminal plate, an insulating plate, and an end plate (not shown) are arranged in this order toward an outer side. The end plate applies a tightening load along the lamination direction of the power generation cells 20.

The anode system device 14 of the fuel cell system 10 includes an anode supply path 40 through which the anode gas is supplied to the fuel cell stack 12 and an anode exhaust path 42 through which the anode off-gas is exhausted from the fuel cell stack 12. In addition, an anode circulation path 44 for returning unreacted hydrogen contained in the anode off-gas in the anode exhaust path 42 to the anode supply path 40 is connected between the anode supply path 40 and the anode exhaust path 42. Further, a purge path 46 through which the anode off-gas is exhausted from a circulation circuit of the anode system device 14 is connected to the anode circulation path 44.

An injector 48 and an ejector 50 are provided in series in the anode supply path 40, and a supply bypass path 52 is connected across the injector 48 and the ejector 50. A bypass (BP) injector 54 is provided in the supply bypass path 52. The injector 48 is a main injector mainly used during power generation, and the BP injector 54 is a sub-injector used to supply highly concentrated hydrogen during start-up of the fuel cell stack 12 or when high load power generation is required.

The ejector 50 supplies the anode gas to the fuel cell stack 12 downstream while suctioning the anode off-gas from the anode circulation path 44 by a negative pressure generated by movement of the anode gas ejected from the injector 48.

The anode exhaust path 42 is provided with a gas-liquid separator 56 that separates water contained in the anode off-gas (generated water during power generation) from the anode off-gas. The anode circulation path 44 is connected to an upper portion of the gas-liquid separator 56, and thus the anode off-gas (gas) flows into the anode circulation path 44.

In addition, the anode circulation path 44 is provided with an anode pump 58 that circulates the anode off-gas to the anode supply path 40. Further, one end of a drain path 60 through which the separated water is discharged is connected to a bottom portion of the gas-liquid separator 56. The drain path 60 is provided with a drain valve 60a that opens and closes a flow path. In addition, the purge path 46 is connected to the drain path 60, and a purge valve 46a that opens and closes a flow path is provided in the middle of the purge path 46.

The cathode system device 16 of the fuel cell system 10 includes a cathode supply path 62 through which the cathode gas is supplied to the fuel cell stack 12 and a cathode exhaust path 64 through which the cathode off-gas is exhausted from the fuel cell stack 12. Between the cathode supply path 62 and the cathode exhaust path 64, a cathode bypass path 66 through which the cathode gas in the cathode supply path 62 directly flows to the cathode exhaust path 64, and a cathode circulation path 68 through which the cathode off-gas in the cathode exhaust path 64 circulates to the cathode supply path 62 are connected.

The cathode supply path 62 is provided with a compressor 70 that compresses and supplies air from the atmosphere. In addition, the cathode supply path 62 includes a supply-side on-off valve 72 downstream of the compressor 70 and downstream of the cathode bypass path 66 and includes a humidifier 74 between the compressor 70 (specifically, downstream of the supply-side on-off valve 72) and the fuel cell stack 12. Although not shown, the cathode supply path 62 is provided with an auxiliary device such as an inter-cooler that cools the cathode gas. Further, in the vicinity of the humidifier 74 installed in the cathode supply path 62, a humidifier bypass path 75 that bypasses the humidifier 74 is provided, and a humidifier bypass valve 75a that opens and closes the humidifier bypass path 75 is provided.

In addition, the humidifier 74 is provided in the cathode exhaust path 64. The humidifier 74 humidifies the cathode gas in the cathode supply path 62 with moisture contained in the cathode off-gas in the cathode exhaust path 64. In addition, the cathode exhaust path 64 includes an exhaust-side on-off valve 76 and a back pressure valve 78 downstream of the humidifier 74 and the cathode circulation path 68. Further, the drain path 60 of the anode system device 14 is connected to the cathode exhaust path 64.

The cathode bypass path 66 is provided with a flow rate adjustment valve 80 that adjusts a flow rate of the cathode gas bypassing the fuel cell stack 12. The cathode circulation path 68 is provided with an EGR pump 82 that circulates the cathode off-gas in the cathode exhaust path 64 to the cathode supply path 62.

The cooling device 18 of the fuel cell system 10 includes a refrigerant supply path 84 through which the refrigerant is supplied to the fuel cell stack 12, and a refrigerant discharging path 86 through which the refrigerant is discharged from the fuel cell stack 12. The refrigerant supply path 84 and the refrigerant discharging path 86 are connected to a radiator 88 that cools the refrigerant. The refrigerant supply path 84 is provided with a refrigerant pump 90 that circulates the refrigerant in a refrigerant circulation circuit (between the fuel cell stack 12, the refrigerant supply path 84, the refrigerant discharging path 86, and the radiator 88).

In addition, the fuel cell system 10 includes a plurality of temperature sensors 92 configured to detect a temperature of the fuel cell stack 12. Examples of the temperature sensor 92 include a refrigerant outlet temperature sensor 92a provided upstream (on the fuel cell stack 12 side) of the refrigerant discharging path 86 and a cathode outlet temperature sensor 92b provided upstream (on the fuel cell stack 12 side) of the cathode exhaust path 64.

The fuel cell system 10 described above includes a control device (information processing device) 200 that controls an operation of each component of the fuel cell system 10. The control device 200 is implemented by, for example, an electronic control unit (ECU) including a processor that performs various calculations, a storage device that includes a non-transitory storage medium storing various types of information, and an input and output device that controls input and output of data between inside and outside of the control device 200. The control device 200 may be implemented by one ECU or may be implemented by a plurality of ECUs.

<Control Device>

Figure 2:
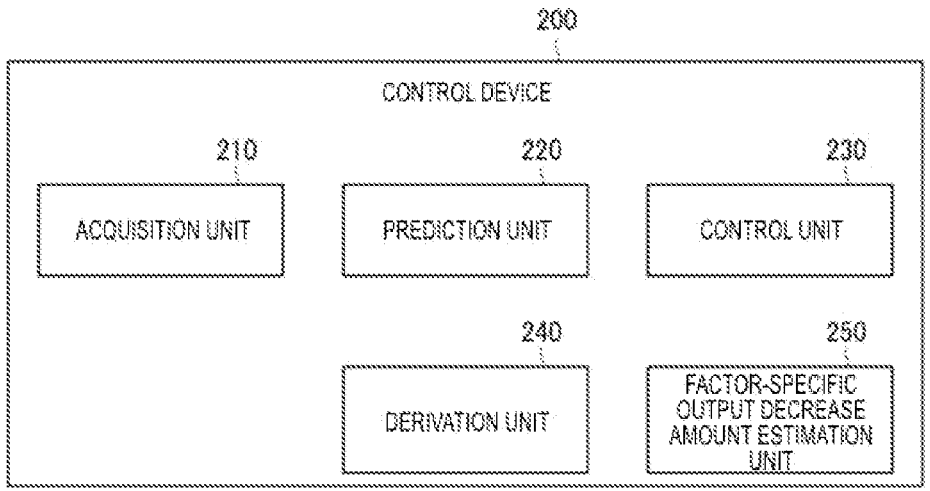
FIG. 2 is a block diagram showing an example of a functional configuration of a control device 200 provided in the vehicle 100.

As shown in FIG. 2, the control device 200 as the information processing device according to the embodiment includes, for example, an acquisition unit 210, a prediction unit 220, and a control unit 230 as functional units implemented by a processor executing a program stored in the storage device of the control device 200.

The acquisition unit 210 acquires use history information indicating a use history of the vehicle 100. The term "use history information" as used herein refers to information indicating the use history of the vehicle 100 for items related to deterioration (in other words, an output decrease) of the fuel cell stack 12. For example, the use history information includes, as the items related to the deterioration of the fuel cell stack 12, information indicating the number of times of start-up of the vehicle 100 (in other words, the number of times of start-up of the fuel cell stack 12), a power generation time of the fuel cell stack 12, and the number of times of fluctuation in an output voltage of the fuel cell stack 12 (hereinafter, also simply referred to as a "voltage fluctuation count").

The use history information may include information indicating a start-up time of the vehicle 100 (in other words, a start-up time of the fuel cell stack 12) instead of or in addition to the information indicating the number of times of start-up. In addition, the use history information may include information indicating the number of times of power generation of the fuel cell stack 12 instead of or in addition to the information indicating the power generation time. Further, the use history information may include information indicating the number of times of fluctuation in an output current of the fuel cell stack 12 (hereinafter, also simply referred to as a "current fluctuation count") instead of or in addition to the information indicating the voltage fluctuation count. Generally, counting the current fluctuation count can be implemented more easily in terms of control than counting the voltage fluctuation count.

In addition, the use history information may include information indicating a power generation time and/or the number of times of power generation for each output current of the fuel cell stack 12. As a specific example, the use history information may include information in which the power generation time of the fuel cell stack 12 up to now is classified into power generation times for each output current, for example, accumulation of time of power generation by an output current of Ia [A] is Na [h], accumulation of time of power generation by an output current of Ib [A] is Nb [h], and so on. In addition, the use history information may include information in which the number of times of power generation of the fuel cell stack 12 up to now is classified into the number of times of power generation for each output current, for example, accumulation of the number of times of power generation by the output current of Ia [A] is Nx [times], and accumulation of the number of times of power generation by the output current of Ib [A] is Ny [times], and so on. If the use history information includes the information indicating the power generation time and/or the number of times of power generation for each output current of the fuel cell stack 12, it is possible to acquire a highly accurate output decrease amount even when an output decrease speed of the fuel cell stack 12 varies depending on a current value of the output current. In addition, the use history information may include information indicating the power generation time and/or the number of times of power generation for each output voltage of the fuel cell stack 12 instead of or in addition to the information indicating the power generation time and/or the number of times of power generation for each output current. That is, the use history information may include information in which the power generation time or the number of times of power generation of the fuel cell stack 12 up to now is classified for each output voltage.

Further, the use history information may include information indicating a travel time and/or the number of times of traveling of the vehicle 100, and information indicating a stop time and/or the number of times of stopping of the vehicle 100.

Figure 3:
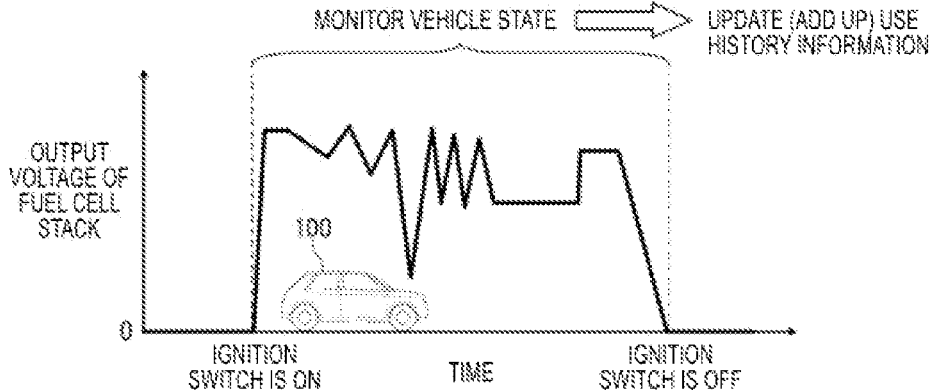
FIG. 3 shows an example of updating use history information according to the embodiment.

For example, as shown in FIG. 3, the control device 200 monitors a state of the vehicle 100 including the output voltage of the fuel cell stack 12 during start-up of the vehicle 100 (while an ignition power supply is on). By this monitoring, the control device 200 successively adds up, for example, the number of times of start-up of the vehicle 100, the power generation time of the fuel cell stack 12, and the voltage fluctuation count from an initial start-up of the vehicle 100, and stores the use history information indicating the number of times of start-up of the vehicle 100, the power generation time of the fuel cell stack 12, and the voltage fluctuation count from the initial start-up of the vehicle 100 up to now in the storage device of the control device 200.

The acquisition unit 210 acquires the use history information stored in the storage device of the control device 200 in this way at a predetermined timing. The timing when the acquisition unit 210 acquires the use history information may be, for example, at the time of start-up of the vehicle 100. In this way, it is possible to predict the output decrease amount of the fuel cell stack 12 each time the vehicle 100 is started. In addition, the timing is not limited to when the vehicle 100 is started, and the acquisition unit 210 may, for example, acquire the use history information when a predetermined operation is received from a user. In this way, the user can predict the output decrease amount of the fuel cell stack 12 at a desired timing.

The prediction unit 220 predicts the output decrease amount of the fuel cell stack 12 based on the use history information acquired by the acquisition unit 210 and output decrease characteristic information indicating an output decrease characteristic of the fuel cell stack 12. Here, the output decrease characteristic information is stored in advance in the storage device of the control device 200, for example. The output decrease characteristic information may be stored in a storage device external to the control device 200 configured for reference by the control device 200.

Figure 4:
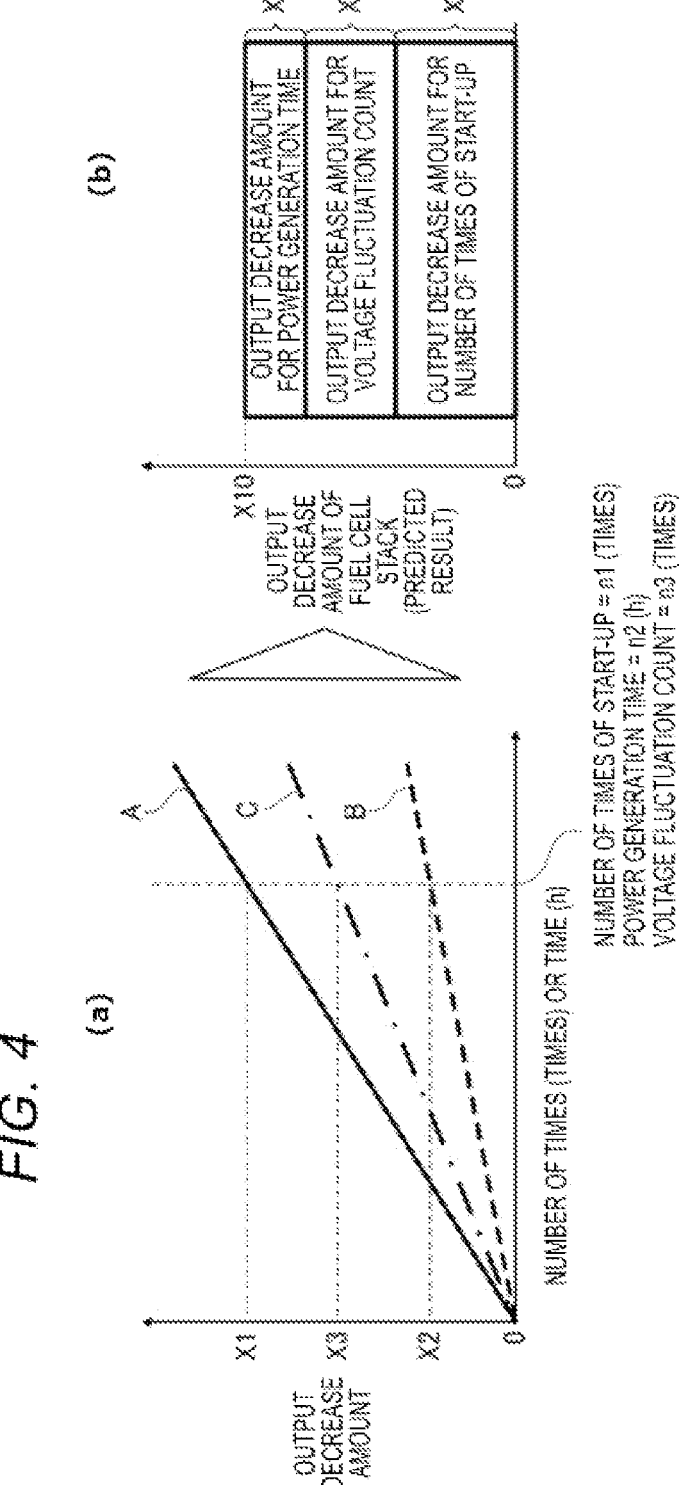
FIG. 4 shows an example of output decrease characteristic information and an example of predicting an output decrease amount by using the output decrease characteristic information according to the embodiment.

For example, as shown in (a) of FIG. 4, the output decrease characteristic information may be information indicating each output decrease characteristic of an output decrease characteristic A, an output decrease characteristic B, and an output decrease characteristic C. Here, the output decrease characteristic A is an output decrease characteristic indicating the output decrease amount of the fuel cell stack 12 according to the number of times of start-up of the vehicle 100. The output decrease characteristic A indicates that the output decrease amount of the fuel cell stack 12 increases as the number of times of start-up of the vehicle 100 increases, and for example, indicates that the output decrease amount of the fuel cell stack 12 is X1 when the number of times of start-up of the vehicle 100 is n1 times (n1>0).

In addition, the output decrease characteristic B herein is an output decrease characteristic indicating the output decrease amount of the fuel cell stack 12 according to the power generation time of the fuel cell stack 12. The output decrease characteristic B indicates that the output decrease amount of the fuel cell stack 12 increases as the power generation time of the fuel cell stack 12 increases, and for example, indicates that the output decrease amount of the fuel cell stack 12 is X2 when the power generation time of the fuel cell stack 12 is n2 [h] (n2>0).

In addition, the output decrease characteristic C herein is an output decrease characteristic indicating the output decrease amount of the fuel cell stack 12 according to the voltage fluctuation count. The output decrease characteristic C indicates that the output decrease amount of the fuel cell stack 12 increases as the voltage fluctuation count increases, and for example, indicates that the output decrease amount of the fuel cell stack 12 is X3 when the voltage fluctuation count is n3 (n3>0).

By referring to such output decrease characteristic information, the prediction unit 220 acquires the output decrease amount of the fuel cell stack 12 for each of the number of times of start-up of the vehicle 100, the power generation time of the fuel cell stack 12, and the voltage fluctuation count indicated by the use history information acquired by the acquisition unit 210. The prediction unit 220 derives a value obtained by adding up the acquired output decrease amounts as a prediction result.

For example, as shown in (b) of FIG. 4, it is assumed that the output decrease amount for the number of times of start-up of the vehicle 100 is X1, the output decrease amount for the power generation time of the fuel cell stack 12 is X2, and the output decrease amount for the voltage fluctuation count is X3. In this case, the prediction unit 220 derives X10=X1+X2+X3 as the prediction result of the output decrease amount of the fuel cell stack 12.

For example, when the use history information includes information indicating the start-up time of the vehicle 100, output decrease characteristic information including information indicating the output decrease amount of the fuel cell stack 12 according to the start-up time of the vehicle 100 is prepared in advance. Similarly, when the use history information includes information indicating the number of times of power generation of the fuel cell stack 12, the travel time and/or the number of times of traveling of the vehicle 100, or the stop time and/or the number of times of stopping of the vehicle 100, output decrease characteristic information including information indicating the output decrease amount of the fuel cell stack 12 according to the number of times of power generation of the fuel cell stack 12, the time and/or the number of times the vehicle 100 has traveled, or the time and/or the number of times the vehicle 100 has stopped is prepared in advance.

When it is determined that a rated output of the fuel cell stack 12 is equal to or less than a threshold value Th based on the output decrease amount predicted by the prediction unit 220, the control unit 230 executes adhering substance removal control of supplying a nitrogen-enriched gas having a higher nitrogen concentration and a lower oxygen concentration than air to the fuel cell stack 12 as the cathode gas. Here, as the rated output of the fuel cell stack 12, a value obtained by subtracting the output decrease amount from an initial rated output of the fuel cell stack 12 is calculated.

Specifically, the adhering substance removal control is control of supplying the cathode off-gas exhausted from the fuel cell stack 12 to the cathode supply path 62. That is, the control unit 230 supplies the cathode off-gas exhausted from the fuel cell stack 12 to the cathode supply path 62 by driving the EGR pump 82 by the adhering substance removal control.

The cathode off-gas exhausted from the fuel cell stack 12 has a higher nitrogen concentration and a lower oxygen concentration than air. By supplying such a cathode off-gas to the cathode supply path 62, the cathode gas supplied to the fuel cell stack 12 can be a nitrogen-enriched gas having a higher nitrogen concentration and a lower oxygen concentration than air. By supplying the nitrogen-enriched cathode gas to the fuel cell stack 12, the fuel cell stack 12 can generate electric power with a higher current and a lower voltage as compared with a case where a cathode gas that is not nitrogen-enriched (that is, air) is supplied to the fuel cell stack 12. In other words, the output current of the fuel cell stack 12 can be increased while preventing excessive electric power from being output from the fuel cell stack 12.

In addition, an amount of generated water during the power generation of the fuel cell stack 12, that is, an amount of water in the cathode off-gas is proportional to the output current of the fuel cell stack 12. Therefore, a large amount of generated water can be generated by increasing the output current of the fuel cell stack 12. By generating a large amount of generated water in this way, a catalyst can be actively cleaned using the generated water. Accordingly, it is possible to remove an adhering substance adhering to the catalyst as the fuel cell stack 12 is used and to recover the rated output of the fuel cell stack 12 that decreases due to the adhering substance.

More specifically, in the vehicle 100, a required output for the travel motor Mt is determined based on a travel speed and an accelerator pedal opening set by a driver. The control unit 230 controls an output of the fuel cell stack 12 so as to output the required output from the travel motor Mt. If the output of the fuel cell stack 12 exceeds the required output of the travel motor Mt, excessive power exceeding the required output may be output from the travel motor Mt. If excessive power exceeding the required output is output from the travel motor Mt, drivability deteriorates, leading to a decrease in marketability of the vehicle 100. The term "excessive electric power" described above is, for example, electric power that causes the travel motor Mt to output power exceeding the required output.

Therefore, the control unit 230 executes the adhering substance removal control of supplying the nitrogen-enriched cathode gas to the fuel cell stack 12, and enables the fuel cell stack 12 to generate electric power with a high current and a low voltage, so that the output current of the fuel cell stack 12 can be increased while the output of the fuel cell stack 12 corresponds to the required output of the travel motor Mt, and the catalyst can be actively cleaned by using the generated water during power generation of the fuel cell stack 12. Accordingly, the adhering substance adhering to the catalyst is removed as the fuel cell stack 12 is used, and thus the rated output of the fuel cell stack 12 that decreases due to the adhering substance is recovered.

Figure 5:
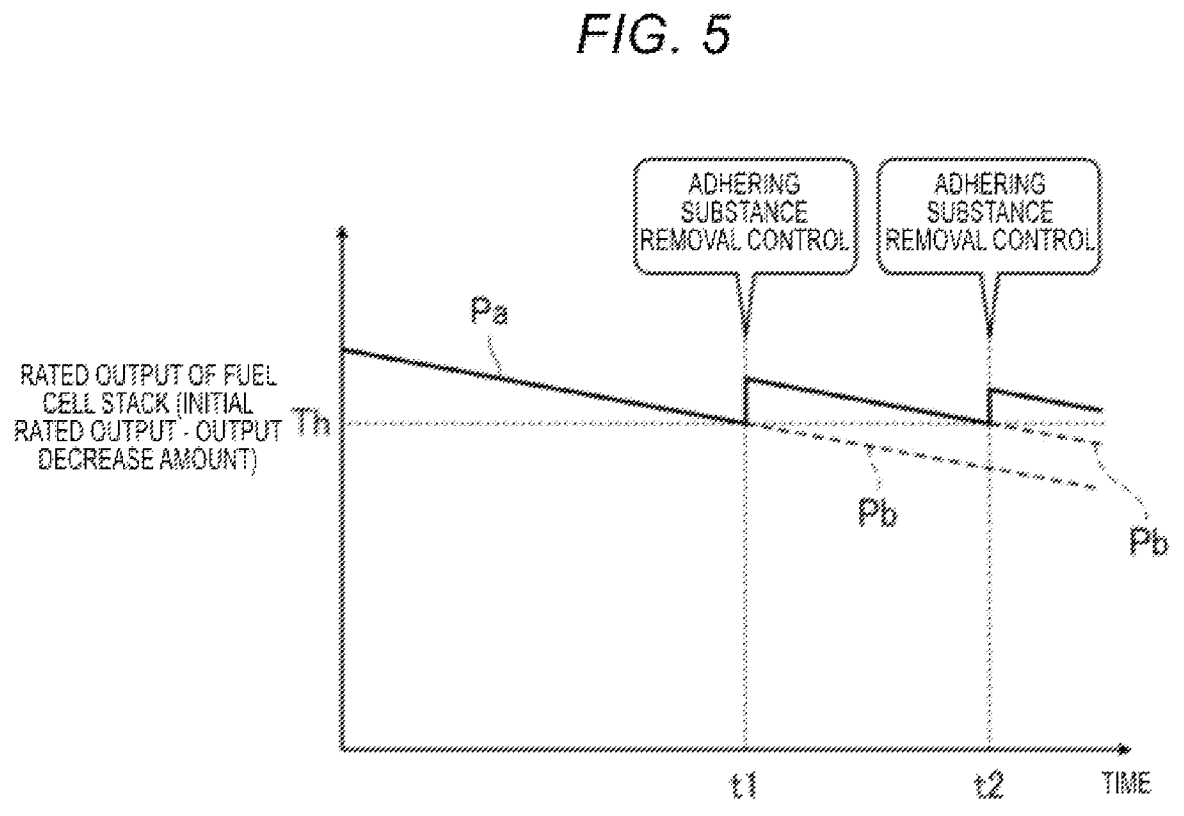

For example, a time t1 and a time t2 shown in FIG. 5 are times when a rated output Pa of the fuel cell stack 12 decreases and reaches the threshold value Th. As shown in FIG. 5, the control unit 230 executes the adhering substance removal control each time the rated output Pa of the fuel cell stack 12 decreases and reaches the threshold value Th, so that the rated output Pa can be increased each time to be higher than a rated output Pb of the fuel cell stack 12 when the adhering substance removal control is not executed.

In addition, even if the rated output of the fuel cell stack 12 is not equal to or less than the threshold value Th, as long as a certain period elapses after the adhering substance removal control of a previous time is executed, it is considered that a certain amount of the adhering substance adheres to the catalyst.

Therefore, the control unit 230 may also execute the adhering substance removal control when a predetermined period elapses since the adhering substance removal control of the previous time. Here, the predetermined period may be a period set in advance for the control device 200 by, for example, a manufacturer of the fuel cell system 10 or the control device 200. As a specific example, the control unit 230 may execute the adhering substance removal control every five years after start of use of the vehicle 100 (the fuel cell system 10).

In addition, the predetermined period may be a period in which at least one of the power generation time of the fuel cell stack 12, the number of times of power generation, the number of times of fluctuation in the output voltage, and the number of times of fluctuation in the output current reaches a predetermined value. Here, the predetermined value is set in advance for the control device 200 by, for example, the manufacturer of the fuel cell system 10 or the control device 200.

In this way, by executing the adhering substance removal control when the predetermined period elapses since the adhering substance removal control of the previous time is executed, the adhering substance removal control is executed in a situation in which it is considered that a certain amount of the adhering substance adheres to the catalyst, the adhering substance adhering to the catalyst is removed, and thus the rated output of the fuel cell stack 12 decreased due to the adhering substance is recovered.

For example, even when the rated output of the fuel cell stack 12 is larger than the threshold value Th, deterioration may progress in a part of constituent elements (catalyst) of the fuel cell stack 12. In such a case, it is desirable to execute control in consideration of a degree of deterioration of the constituent elements, which is a main output decrease factor of the fuel cell stack 12.

Therefore, as shown in FIG. 2, the control device 200 further includes a derivation unit 240 and a factor-specific output decrease amount estimation unit 250, for example, as functional units implemented by a processor executing a program stored in the storage device of the control device 200.

The derivation unit 240 derives the output decrease amount for each item based on the use history information acquired by the acquisition unit 210 and the output decrease characteristic information (described above) indicating the output decrease characteristic of the fuel cell stack 12 for each item. For example, similarly to the prediction unit 220 described above, the derivation unit 240 derives, as the output decrease amount for each item, the output decrease amount for the number of times of start-up of the vehicle 100, the output decrease amount for the power generation time of the fuel cell stack 12, and the output decrease amount for the voltage fluctuation count. The derivation unit 240 may be implemented by the prediction unit 220.

The factor-specific output decrease amount estimation unit 250 estimates an output decrease amount for each output decrease factor based on the output decrease amount for each item derived by the derivation unit 240 and output decrease factor information indicating the output decrease factor of the fuel cell stack 12 for each item. Here, the output decrease factor information is stored in advance in the storage device of the control device 200, for example. The output decrease factor information may be stored in a storage device external to the control device 200 configured for reference by the control device 200.

Figure 6:
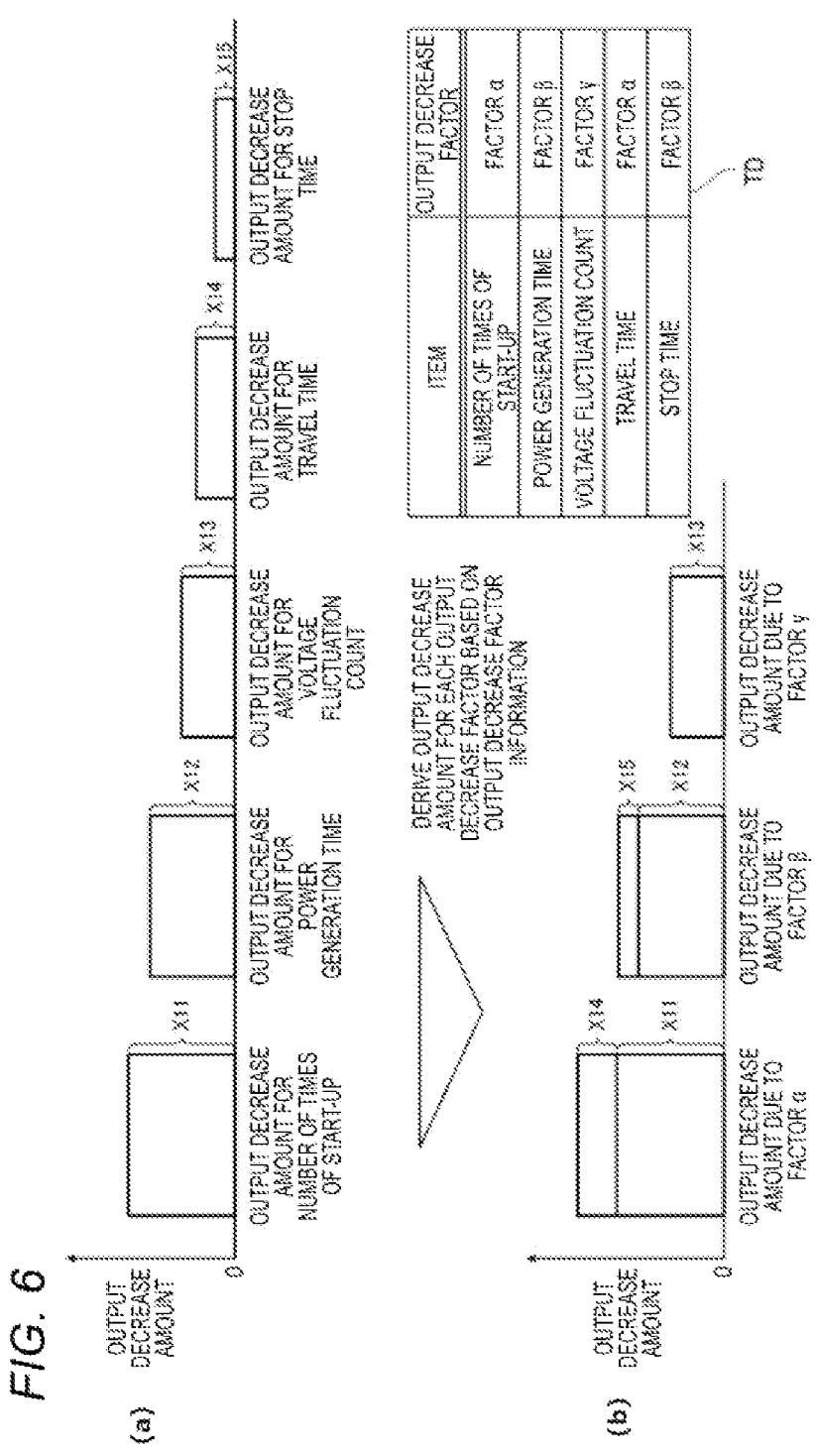
FIG. 6 shows an example of output decrease factor information and an example of deriving an output decrease amount by using the output decrease factor information according to the embodiment.

Items in the output decrease factor information correspond to the items in the use history information acquired by the acquisition unit 210. For example, when the use history information acquired by the acquisition unit 210 is the number of times of start-up of the vehicle 100, the power generation time of the fuel cell stack 12, the voltage fluctuation count of the fuel cell stack 12, the travel time of the vehicle 100, and the stop time of the vehicle 100, as shown in FIG. 6, items in output decrease factor information TD are also the number of times of start-up, the power generation time, the voltage fluctuation count, the travel time, and the stop time. In addition, the output decrease factor information TD shown in FIG. 6 indicates that an output decrease factor for the number of times of start-up and the travel time is a factor α, an output decrease factor for the power generation time and the stop time is a factor β, and an output decrease factor for the voltage fluctuation count is a factor γ. For example, the factor α may be deterioration of a platinum component in the catalyst, the factor β may be deterioration of a carbon component in the catalyst, and the factor γ may be an increase in internal resistance of the fuel cell stack 12, and the factors are not limited thereto.

Based on the use history information acquired by the acquisition unit 210 and the output decrease characteristic information for each item (see (a) of FIG. 4), the derivation unit 240 derives the output decrease amount of the fuel cell stack 12 for each item, that is, an output decrease amount X11 for the number of times of start-up, an output decrease amount X12 for the power generation time, an output decrease amount X13 for the voltage fluctuation count, an output decrease amount X14 for the travel time, and an output decrease amount X15 for the stop time, for example, as shown in (a) of FIG. 6.

In this case, the factor-specific output decrease amount estimation unit 250 estimates the output decrease amount for each output decrease factor, for example, as shown in (b) of FIG. 6, based on the output decrease amounts X11, X12, X13, X14, and X15 for each item derived by the derivation unit 240 and the output decrease factor information TD.

That is, the factor-specific output decrease amount estimation unit 250 derives a total value X11+X14 of the output decrease amount X11 for the number of times of start-up and the output decrease amount X14 for the travel time as the output decrease amount due to the factor α. In addition, the factor-specific output decrease amount estimation unit 250 derives a total value X12+X15 of the output decrease amount X12 for the power generation time and the output decrease amount X15 for the stop time as the output decrease amount due to the factor R. In addition, the factor-specific output decrease amount estimation unit 250 derives the output decrease amount X13 for the voltage fluctuation count as the output decrease amount due to the factor γ.

The control unit 230 is configured to execute predetermined control based on the output decrease amount for each output decrease factor estimated by the factor-specific output decrease amount estimation unit 250. More specifically, when an output decrease amount for a predetermined output decrease factor among output decrease amounts for the respective output decrease factors is equal to or larger than a threshold value, the control unit 230 executes the adhering substance removal control of supplying the nitrogen-enriched gas having a higher nitrogen concentration and a lower oxygen concentration than air to the fuel cell stack 12 as the cathode gas.

Figure 7:
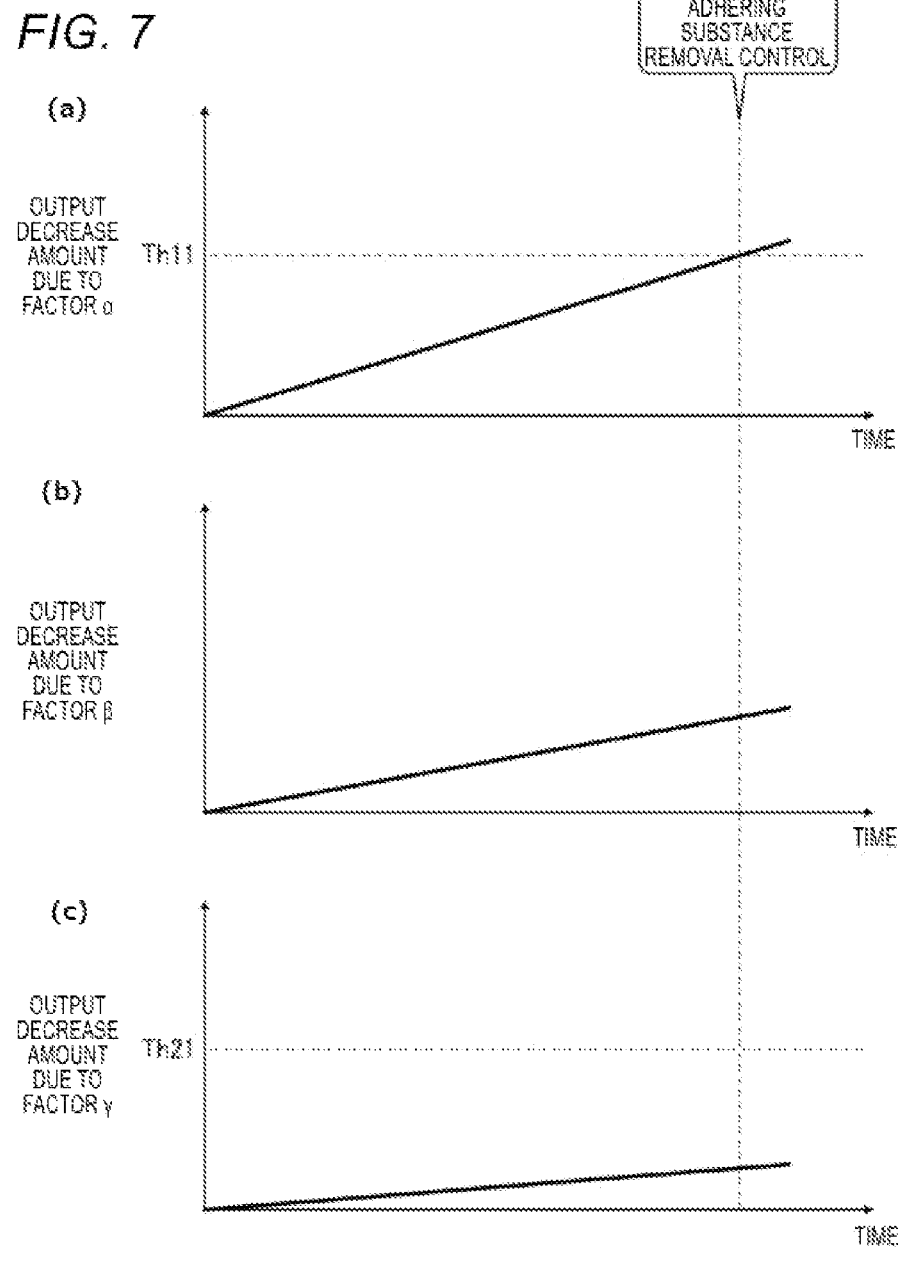
FIG. 7 is an explanatory diagram showing execution conditions of the adhering substance removal control for each output decrease factor according to the embodiment.

For example, as shown in (a) of FIG. 7, a threshold value Th11 is set for the factor α. Therefore, when the output decrease amount due to the factor α is equal to or larger than the threshold value Th11, the control unit 230 executes the adhering substance removal control. The threshold value Th II is set in advance for the control device 200 by, for example, the manufacturer of the fuel cell system 10 or the control device 200.

In addition, for example, as shown in (c) of FIG. 7, a threshold value Th21 is set for the factor γ. Therefore, when the output decrease amount due to the factor γ is equal to or larger than the threshold value Th21, the control unit 230 executes the adhering substance removal control. The threshold value Th21 is set in advance for the control device 200 by, for example, the manufacturer of the fuel cell system 10 or the control device 200.

On the other hand, for example, as shown in (b) of FIG. 7, no threshold value is set for the factor β for which it is difficult to obtain any effect even when the adhering substance removal control is executed. Therefore, the control unit 230 does not execute the adhering substance removal control under the condition of the output decrease amount due to the factor β. Accordingly, the adhering substance removal control is not executed in a situation in which an effect thereof is assumed to be poor even if the adhering substance removal control is executed, and thus it is possible to prevent excessive adhering substance removal control.

In this way, even when the rated output of the fuel cell stack 12 is larger than the threshold value Th, when the output decrease amounts of the fuel cell stack 12 for the predetermined output decrease factors α and γ are equal to or larger than the threshold values Th11 and Th21, respectively, the adhering substance removal control of supplying the nitrogen-enriched gas having a higher nitrogen concentration and a lower oxygen concentration than air to the fuel cell stack 12 as the cathode gas is executed, so that the fuel cell stack 12 can generate electric power with a higher current and a lower voltage as compared with a case where air is supplied to the fuel cell stack 12 as the cathode gas. Therefore, it is possible to increase the output current of the fuel cell stack 12 so as to increase generated water generated during power generation while preventing excessive electric power output from the fuel cell stack 12, and it is possible to actively clean inside (for example, an electrode or the like) of the fuel cell stack 12 with the generated water. The adhering substance adhering to the inside of the fuel cell stack 12 is removed, the output decrease of the fuel cell stack 12 caused by the adhering substance (for example, the output decrease due to the output decrease factor α or γ) is reduced, and thus the rated output of the fuel cell stack 12 is recovered.

<Processing Executed by Control Device>

Next, an example of processing executed by the control device 200 will be described with reference to FIG. 8. For example, when the vehicle 100 is in a travelable state, the control device 200 repeats the execution of the processing shown in FIG. 8 at a predetermined cycle.

Figure 8:
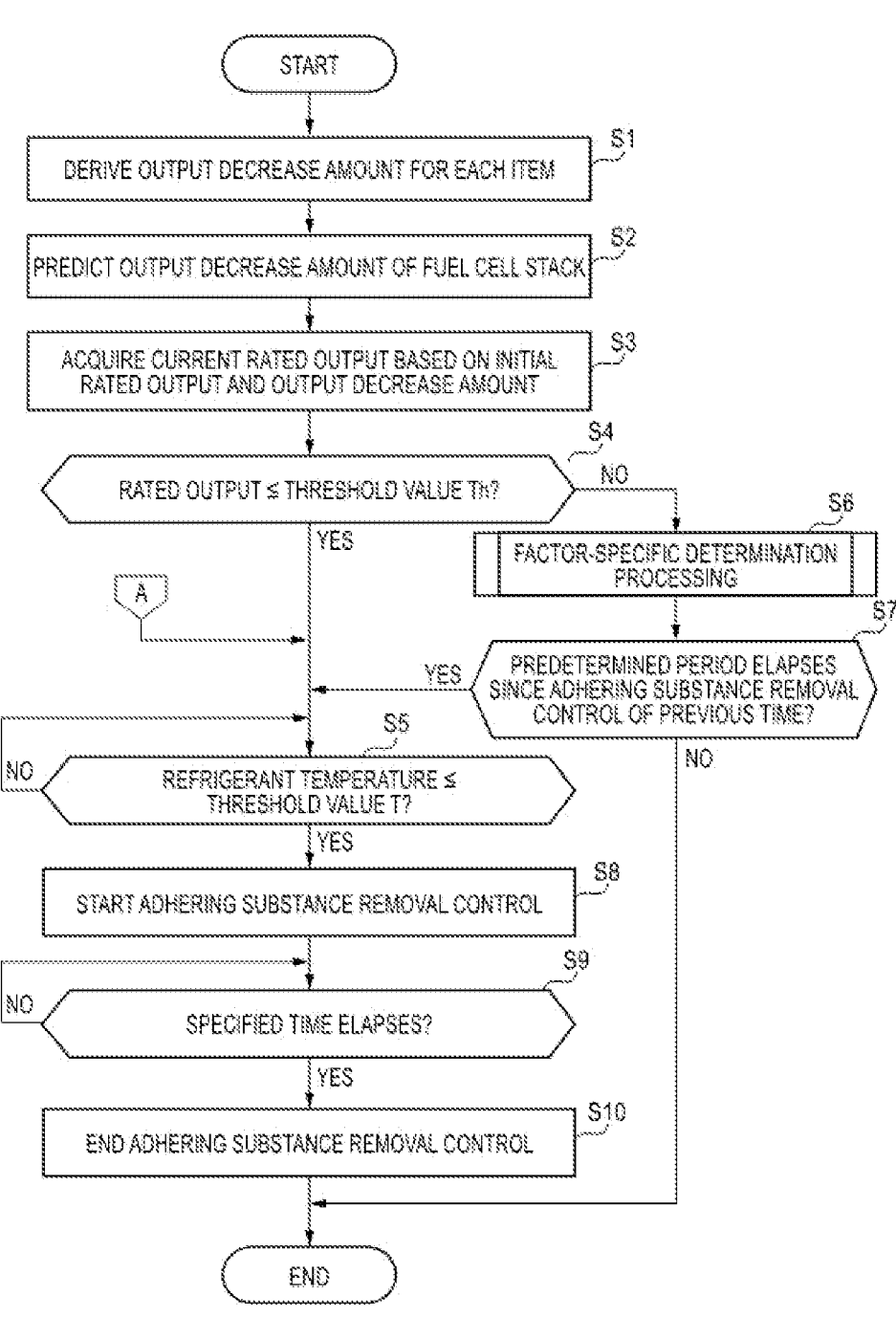
FIG. 8 is a flow chart showing an example of processing executed by the control device 200 according to the embodiment.

As shown in FIG. 8, the control device 200 derives the output decrease amount for each item of the fuel cell stack 12 (step S1). Next, the control device 200 predicts the output decrease amount of the fuel cell stack 12 based on the derived output decrease amount for each item (step S2) and acquires a current rated output based on the initial rated output and the predicted output decrease amount (step S3).

Next, the control device 200 determines whether the current rated output of the fuel cell stack 12 is equal to or less than the threshold value Th (step S4). As a result, when it is determined that the current rated output of the fuel cell stack 12 is equal to or less than the threshold value Th (step S4: Yes), the control device 200 proceeds to processing of step S5.

On the other hand, when it is determined that the current rated output of the fuel cell stack 12 is not equal to or less than the threshold value Th (step S4: No), the control device 200 proceeds to factor-specific determination processing (step S6).

Figure 9:
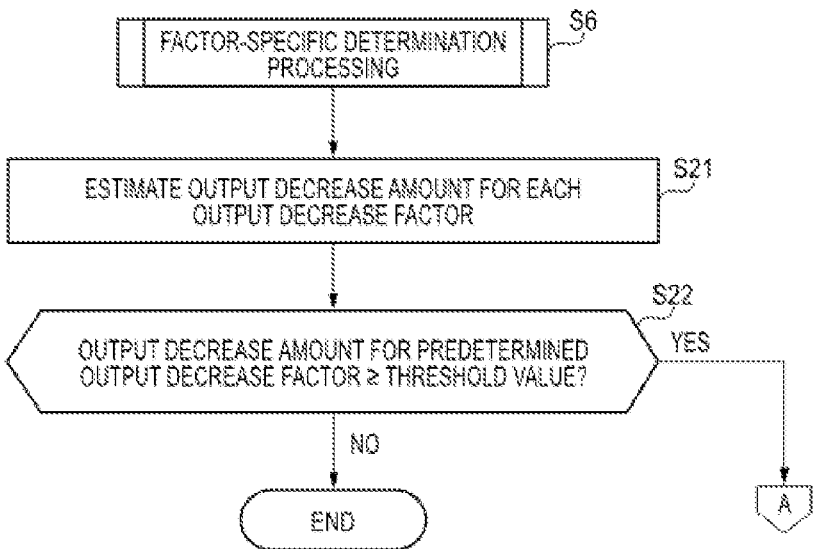
FIG. 9 is a flow chart showing an example of factor-specific determination processing executed by the control device 200 according to the embodiment.

As shown in FIG. 9, in the factor-specific determination processing (step S6), the control device 200 estimates the output decrease amount for each output decrease factor based on the output decrease amount for each item and the output decrease factor information TD (step S21) and determines whether the output decrease amount for any output decrease factor is equal to or larger than the threshold value, that is, whether the output decrease amount due to the factor α is equal to or larger than the threshold value Th11, or whether the output decrease amount due to the factor γ is equal to or larger than the threshold value Th21 (step S22).

As a result, when it is determined that the output decrease amount for any one of the output decrease factors is equal to or larger than the threshold value (step S22: Yes), the control device 200 proceeds to step S5 in FIG. 8.

On the other hand, when it is determined that all of the output decrease amounts for the output decrease factors are less than the threshold value (step S22: No), the control device 200 proceeds to step S7 in FIG. 8, and determines whether a predetermined period elapses since the adhering substance removal control of a previous time. As a result, if it is determined that the predetermined period elapses since the adhering substance removal control of the previous time (step S7: Yes), the control device 200 proceeds to processing of step S5.

In the processing of step S5, the control device 200 determines whether a temperature of a refrigerant that cools the fuel cell stack 12 is equal to or less than a threshold value T (step S5). As a result, when it is determined that the temperature of the refrigerant is equal to or less than the threshold value T (step S5: Yes), the control device 200 starts the adhering substance removal control (step S8). The threshold value T is set in advance for the control device 200 by, for example, the manufacturer of the fuel cell system 10 or the control device 200.

The control device 200 determines whether a specified time elapses since start of the adhering substance removal control (step S9), and when it is determined that the specified time elapses (step S9: Yes), the adhering substance removal control is ended (step S10). The specified time is set in advance for the control device 200 by, for example, the manufacturer of the fuel cell system 10 or the control device 200.

As described above, when the rated output of the fuel cell stack 12 is equal to or less than the threshold value Th (step S4: Yes), when the predetermined period elapses since the adhering substance removal control of the previous time (step S7: Yes), or when the output decrease amount for any one of the output decrease factors is equal to or larger than the threshold value (step S22: Yes), the control device 200 executes the adhering substance removal control. Accordingly, the output current of the fuel cell stack 12 is increased while an output of excessive electric power from the fuel cell stack 12 is prevented, and the adhering substance adhering to the catalyst is removed, so that the rated output of the fuel cell stack 12 can be recovered.

In addition, when the temperature of the refrigerant that cools the fuel cell stack 12 is higher than the threshold value T, it is assumed that the fuel cell stack 12 is under high load power generation. Therefore, as described above, it is desirable that the control device 200 executes the adhering substance removal control only when the temperature of the refrigerant that cools the fuel cell stack 12 is equal to or less than the threshold value T (step S5: Yes). In this way, it is possible to avoid a situation in which the adhering substance removal control is executed during high load power generation of the fuel cell stack 12 and electric power that can be output from the fuel cell stack 12 decreases. Accordingly, it is possible to ensure electric power required to drive the travel motor Mt of the vehicle 100, and it is possible to avoid occurrence of faltering or the like of the vehicle 100 caused by insufficient electric power. From a viewpoint of preventing the adhering substance removal control from being executed during high load power generation of the fuel cell stack 12, for example, the adhering substance removal control may be executed when an output current value of the fuel cell stack 12 is equal to or less than a first predetermined value and a state of charge (SOC) of the battery Bt is equal to or larger than a second predetermined value, instead of or in addition to above condition based on the temperature of the refrigerant. In this case, the first predetermined value and the second predetermined value are set in advance for the control device 200 by the manufacturer of the fuel cell system 10 or the control device 200.

In addition, if the adhering substance removal control is executed when the temperature of the refrigerant that cools the fuel cell stack 12 is higher than the threshold value T, the fuel cell stack 12 may become overvoltage, and a temperature of the fuel cell stack 12 may further increase. If such a situation occurs, performance of the catalyst may be degraded. Therefore, from this viewpoint, it is still desirable that the control device 200 executes the adhering substance removal control only when the temperature of the refrigerant that cools the fuel cell stack 12 is equal to or less than the threshold value T.

As described above, according to the embodiment of the present invention, by executing control in consideration of the degree of deterioration of the fuel cell stack 12, it is possible to prevent the output decrease due to the deterioration of the fuel cell stack 12 and to ensure the output of the fuel cell stack 12. In addition, it is possible to contribute to efficiency of energy.

Although the embodiment of the present invention has been described above with reference to the accompanying drawings, it goes without saying that the present invention is not limited to the embodiment. It is apparent that those skilled in the art can conceive of various modifications and alterations within the scope described in the claims, and it is understood that such modifications and alterations naturally fall within the technical scope of the present invention. In addition, the respective constituent elements in the above embodiment may be combined as desired without departing from the gist of the invention.

For example, in the above embodiment, the control device 200 executes the adhering substance removal control when it is determined that the rated output of the fuel cell stack 12 calculated based on the predicted output decrease amount is equal to or less than the threshold value Th, but the present invention is not limited thereto. For example, the control device 200 may also execute the adhering substance removal control when a difference between an output of the fuel cell stack 12 (for example, the rated output, hereinafter, also referred to as an "estimated output value") calculated based on the predicted output decrease amount and an actually measured output of the fuel cell stack 12 (hereinafter, also referred to as an "actual measurement value") is equal to or larger than a predetermined threshold value. That is, when the actual measurement value deviates from the estimated output value by a value that is equal to or larger than the threshold value, a factor thereof may be an adhering substance on the catalyst. Therefore, by executing the adhering substance removal control when the difference between the estimated output value and the actual measurement value is equal to or larger than the threshold value, it is possible to recover the output of the fuel cell stack 12 that decreases due to the adhering substance.

In addition, for example, when the rated output of the fuel cell stack 12 calculated based on the predicted output decrease amount is equal to or less than the threshold value Th, the control device 200 may notify a user of the fact and may receive an operation of selecting whether to execute the adhering substance removal control from the user. Then, the control device 200 may execute the adhering substance removal control on condition that an operation to execute the adhering substance removal control is received from the user. Accordingly, it is possible to prevent the adhering substance removal control from being executed against will of the user. In addition, for example, when the control device 200 and a terminal device (for example, a smartphone) of the user can communicate with each other, the control device 200 may execute the notification described above via the terminal device of the user. Further, for example, the control device 200 may download a program or data necessary for executing the adhering substance removal control from a server device capable of communicating with the control device 200, based on the reception of the operation to execute the adhering substance removal control from the user.

In addition, in the above embodiment, the adhering substance removal control is executed when it is determined that the rated output of the fuel cell stack 12 is equal to or less than the threshold value Th, but the present invention is not limited thereto. It is considered that the output decrease of the fuel cell stack 12 due to the adhering substance occurs not only during high load power generation when the output of the fuel cell stack 12 is the rated output but also during low load power generation. Therefore, for example, a threshold value (determination value) serving as a condition for executing the adhering substance removal control may be set for each output (that is, load) of the fuel cell stack 12, and the adhering substance removal control may be executed when it is determined that the output of the fuel cell stack 12 is equal to or less than the threshold value corresponding to the output.

In addition, in the above embodiment, an example in which the information processing device according to the present invention is implemented by the control device 200 provided in the vehicle 100 is described, but the present invention is not limited thereto. For example, a part or all of the function units, that is, the acquisition unit 210, the prediction unit 220, the control unit 230, the derivation unit 240, and the factor-specific output decrease amount estimation unit 250 of the control device 200 described above may be implemented by a server device capable of communicating with the control device 200. That is, the information processing device according to the present invention may be implemented by a server device capable of communicating with the control device 200 provided in the vehicle 100. In addition, the server device may be a virtual server (cloud server) implemented by a cloud computing service or maybe a physical server implemented as a single device.

Further, the information processing device according to the present invention is not limited to being in the vehicle 100 and can be applied to any fuel cell system including a fuel cell. Here, the fuel cell system can be, for example, a stationary residential power supply system including a fuel cell such as the fuel cell stack 12, which is referred to as a "residential fuel cell cogeneration system". When the present invention is applied to such a fuel cell system, the acquisition unit 210 provided in the control device 200 as an example of the information processing device may acquire use history information indicating a use history of the fuel cell system for a plurality of items related to an output decrease of the fuel cell system. In addition, the derivation unit 240 may derive an output decrease amount for each item based on the use history information acquired by the acquisition unit 210 and output decrease characteristic information indicating an output decrease characteristic of the fuel cell system for each item. In addition, the factor-specific output decrease amount estimation unit 250 may estimate an output decrease amount for each output decrease factor based on the output decrease amount for each item derived by the derivation unit 240 and output decrease factor information indicating an output decrease factor of the fuel cell system for each item. Then, when an output decrease amount for a predetermined output decrease factor among output decrease amounts for the respective output decrease factors is equal to or larger than a threshold value based on the output decrease amount for each output decrease factor estimated by the factor-specific output decrease amount estimation unit 250, the control unit 230 may execute adhering substance removal control of supplying a nitrogen-enriched gas having a higher nitrogen concentration and a lower oxygen concentration than air to the fuel cell as a cathode gas. In this way, even when the information processing device according to the present invention is applied to any fuel cell system including a fuel cell, it is possible to increase an output current of the fuel cell so as to increase generated water during power generation while preventing excessive electric power from being output from the fuel cell, and it is possible to actively clean an electrode of the fuel cell by the generated water. By removing an adhering substance adhering to the electrode, an output decrease of the fuel cell due to the adhering substance is reduced, and a rated output of the fuel cell is recovered.

At least the following matters are described in this specification. Although the corresponding constituent elements and the like in the above-described embodiment are shown in parentheses, the present invention is not limited thereto.

(1) An information processing device (control device 200) configured to predict an output decrease amount of a fuel cell (fuel cell stack 12) in a vehicle (vehicle 100) including the fuel cell and a drive source (travel motor Mt) driven by electric power of the fuel cell, the information processing device comprising:

an acquisition unit (acquisition unit 210) configured to acquire use history information indicating a use history of the vehicle for a plurality of items related to an output decrease of the fuel cell;

a derivation unit (derivation unit 240) configured to derive the output decrease amount for each of the items based on the use history information acquired by the acquisition unit and output decrease characteristic information indicating an output decrease characteristic of the fuel cell for each of the items;

a factor-specific output decrease amount estimation unit (factor-specific output decrease amount estimation unit 250) configured to estimate the output decrease amount for each output decrease factor based on the output decrease amount for each item derived by the derivation unit and output decrease factor information (output decrease factor information TD) indicating the output decrease factor of the fuel cell for each of the items; and a control unit (control unit 230) configured to execute predetermined control based on the output decrease amount for each output decrease factor estimated by the factor-specific output decrease amount estimation unit, in which when an output decrease amount for a predetermined output decrease factor (factor α, factor γ) among output decrease amounts for the respective output decrease factors is equal to or larger than a threshold value (threshold value Th11, threshold value Th21), the control unit executes adhering substance removal control of supplying a nitrogen-enriched gas having a higher nitrogen concentration and a lower oxygen concentration than air to the fuel cell as a cathode gas.

According to (1), when it is determined that the output decrease amount for the predetermined output decrease factor of the fuel cell is equal to or larger than the threshold value, it is possible to execute the adhering substance removal control of supplying the nitrogen-enriched gas having a higher nitrogen concentration and a lower oxygen concentration than air to the fuel cell as the cathode gas. Accordingly, it is possible to generate electric power with a higher current and a lower voltage by the fuel cell as compared with a case where air is supplied to the fuel cell as the cathode gas. Therefore, it is possible to increase an output current of the fuel cell so as to increase generated water generated during power generation while preventing excessive electric power output from the fuel cell, and it is possible to actively clean inside (for example, an electrode or the like) of the fuel cell with the generated water. The adhering substance adhering to the inside of the fuel cell is removed, the output decrease of the fuel cell caused by the adhering substance (for example, an output decrease due to a predetermined output decrease factor) is reduced, and thus a rated output of the fuel cell is recovered.

(2) The information processing device according to (1), in which the control unit further executes the adhering substance removal control when it is determined that an output of the fuel cell is equal to or less than a threshold value (threshold value Th) based on the output decrease amount for each of the output decrease factors.

According to (2), when it is determined that the output of the fuel cell is equal to or less than the threshold value, the adhering substance removal control can be executed to remove the adhering substance adhering to the inside of the fuel cell.

(3) The information processing device according to (1) or (2), in which the control unit further executes the adhering substance removal control when a difference between an output of the fuel cell calculated based on the predicted output decrease amount and an actually measured output of the fuel cell is equal to or larger than a threshold value.

According to (3), when the actually measured output of the fuel cell deviates from the output of the fuel cell calculated based on the output decrease amount by a value equal to or larger than the threshold value, the adhering substance removal control can be executed, and thus the output of the fuel cell decreased due to the adhering substance is recovered.

(4) The information processing device according to any one of (1) to (3), in which the adhering substance removal control is control of supplying a cathode off-gas exhausted from the fuel cell to a cathode supply path (cathode supply path 62) through which the cathode gas is supplied to the fuel cell.

According to (4), the nitrogen-enriched gas can be generated using the cathode off-gas exhausted from the fuel cell.

(5) The information processing device according to any one of (1) to (4), in which the control unit further executes the adhering substance removal control when a predetermined period elapses since the adhering substance removal control of a previous time.

According to (5), it is possible to remove the adhering substance adhering to the inside of the fuel cell by executing the adhering substance removal control when it is assumed that a certain amount of the adhering substance adheres to the inside of the fuel cell.

(6) The information processing device according to (5), in which the predetermined period is a period in which at least one of a power generation time of the fuel cell, the number of times of power generation, the number of times of fluctuation in an output voltage, and the number of times of fluctuation in an output current reaches a predetermined value.

According to (6), since the adhering substance removal control is executed when at least one of the power generation time, the number of times of power generation, the number of times of fluctuation in the output voltage, and the number of times of fluctuation in the output current of the fuel cell reaches the predetermined value since the adhering substance removal control of the previous time, it is possible to remove the adhering substance adhering to the inside of the fuel cell by executing the adhering substance removal control when it is assumed that a certain amount of the adhering substance adheres to the inside of the fuel cell.

(7) The information processing device according to any one of (1) to (6), in which the control unit executes the adhering substance removal control when a temperature of a refrigerant that cools the fuel cell is equal to or less than a threshold value.

When the temperature of the refrigerant that cools the fuel cell is higher than the threshold value T, it is assumed that the fuel cell is under high load power generation. According to (7), since the adhering substance removal control is executed when the temperature of the refrigerant that cools the fuel cell is equal to or less than the threshold value, it is possible to avoid execution of the adhering substance removal control during high load power generation of the fuel cell, which may decrease electric power that can be output by the fuel cell. Accordingly, it is possible to ensure electric power required to drive the drive source of the vehicle, and it is possible to avoid occurrence of faltering or the like of the vehicle caused by insufficient electric power.

(8) A vehicle including:

the information processing device according to any one of (1) to (7);

the fuel cell; and the drive source.

According to (8), when it is determined that the output decrease amount for the predetermined output decrease factor of the fuel cell is equal to or larger than the threshold value, it is possible to execute the adhering substance removal control of supplying the nitrogen-enriched gas having a higher nitrogen concentration and a lower oxygen concentration than air to the fuel cell as the cathode gas. Accordingly, it is possible to generate electric power with a higher current and a lower voltage by the fuel cell as compared with a case where air is supplied to the fuel cell as the cathode gas. Therefore, it is possible to increase an output current of the fuel cell so as to increase generated water generated during power generation while preventing excessive electric power output from the fuel cell, and it is possible to actively clean inside (for example, an electrode or the like) of the fuel cell with the generated water. The adhering substance adhering to the inside of the fuel cell is removed, the output decrease of the fuel cell caused by the adhering substance (for example, an output decrease due to a predetermined output decrease factor) is reduced, and thus a driving force of the vehicle provided by the drive source can be ensured.

(9) An information processing device configured to predict an output decrease amount of a fuel cell in a fuel cell system including the fuel cell, the information processing device including:

an acquisition unit configured to acquire use history information indicating a use history of the fuel cell system for a plurality of items related to an output decrease of the fuel cell;

a derivation unit configured to derive the output decrease amount for each of the items based on the use history information acquired by the acquisition unit and output decrease characteristic information indicating an output decrease characteristic of the fuel cell for each of the items;

a factor-specific output decrease amount estimation unit configured to estimate the output decrease amount for each output decrease factor based on the output decrease amount for each item derived by the derivation unit and output decrease factor information indicating the output decrease factor of the fuel cell for each of the items; and a control unit configured to execute predetermined processing based on the output decrease amount for each output decrease factor estimated by the factor-specific output decrease amount estimation unit, in which when an output decrease amount for a predetermined output decrease factor among output decrease amounts for the respective output decrease factors is equal to or larger than a threshold value, the control unit executes adhering substance removal control of supplying a nitrogen-enriched gas having a higher nitrogen concentration and a lower oxygen concentration than air to the fuel cell as a cathode gas.

According to (9), when it is determined that the output decrease amount for the predetermined output decrease factor of the fuel cell is equal to or larger than the threshold value, it is possible to execute the adhering substance removal control of supplying the nitrogen-enriched gas having a higher nitrogen concentration and a lower oxygen concentration than air to the fuel cell as the cathode gas. Accordingly, it is possible to generate electric power with a higher current and a lower voltage by the fuel cell as compared with a case where air is supplied to the fuel cell as the cathode gas. Therefore, it is possible to increase an output current of the fuel cell so as to increase generated water generated during power generation while preventing excessive electric power output from the fuel cell, and it is possible to actively clean inside (for example, an electrode or the like) of the fuel cell with the generated water. The adhering substance adhering to the inside of the fuel cell is removed, the output decrease of the fuel cell caused by the adhering substance (for example, an output decrease due to a predetermined output decrease factor) is reduced, and thus the rated output of the fuel cell is recovered.

What is claimed is:

1. An information processing device configured to predict an output decrease amount of a fuel cell in a vehicle including the fuel cell and a drive source driven by electric power of the fuel cell, the information processing device comprising:

circuitry configured to;

acquire use history information indicating a use history of the vehicle for a plurality of items related to an output decrease of the fuel cell, the plurality of items including at least one of a number of times of starts of the fuel cell, a number of times of power generation of the fuel cell, a number of times of fluctuations in an output voltage, a travel time of the vehicle, and a stop time of the vehicle;

derive the output decrease amount for each of the items based on the acquired use history information and information indicating a characteristic of the output decrease of the fuel cell for each of the items;

estimate the estimated output decrease amount for each factor of the output decrease based on the derived output decrease amount for each item and information indicating a factor of the output decrease of the fuel cell for each of the items; and execute predetermined control based on the estimated output decrease amount for each factor of the output decrease, wherein when an output decrease amount for a predetermined factor of the output decrease among output decrease amounts for factors of the respective output decrease is equal to or larger than a threshold value, the circuitry is configured to execute adhering substance removal control of supplying a nitrogen-enriched gas having a higher nitrogen concentration and a lower oxygen concentration than air to the fuel cell as a cathode gas.

2. The information processing device according to claim 1, wherein the circuitry is configured to further execute the adhering substance removal control when it is determined that an output of the fuel cell is equal to or less than a threshold value based on the output decrease amount for each of the output decrease factors.

3. The information processing device according to claim 2, wherein the circuitry is configured to further execute the adhering substance removal control when a difference between an output of the fuel cell calculated based on the predicted output decrease amount and an actually measured output of the fuel cell is equal to or larger than a threshold value.

4. The information processing device according to claim 1, wherein the adhering substance removal control is control of supplying a cathode off-gas exhausted from the fuel cell to a cathode supply path through which the cathode gas is supplied to the fuel cell.

5. The information processing device according to claim 1, wherein the circuitry is configured to further execute the adhering substance removal control when a predetermined period elapses since the adhering substance removal control of a previous time.

6. The information processing device according to claim 5, wherein the predetermined period is a period in which at least one of a power generation time of the fuel cell, the number of times of power generation, the number of times of fluctuation in an output voltage, and the number of times of fluctuation in an output current reaches a predetermined value.

7. The information processing device according to claim 1, wherein the circuitry is configured to execute the adhering substance removal control when a temperature of a refrigerant that cools the fuel cell is equal to or less than a threshold value.

8. A vehicle comprising:

the information processing device according to claim 1;

the fuel cell; and the drive source.

9. An information processing device configured to predict an output decrease amount of a fuel cell in a fuel cell system including the fuel cell, the information processing device comprising:

circuitry configured to acquire use history information indicating a use history of the fuel cell system for a plurality of items related to an output decrease of the fuel cell;

derive the output decrease amount for each of the items based on the acquired use history information and information indicating a characteristic of the output decrease of the fuel cell for each of the items;

estimate the output decrease amount for each factor of the output decrease based on the derived output decrease amount for each item and information indicating a factor of the output decrease of the fuel cell for each of the items; and execute predetermined processing based on the estimated output decrease amount for each factor of the output decrease, wherein when an output decrease amount for a predetermined factor of the output decrease among output decrease amounts for factors of the output decrease factors is equal to or larger than a threshold value, the circuitry is configured to execute adhering substance removal control of supplying a nitrogen-enriched gas having a higher nitrogen concentration and a lower oxygen concentration than air to the fuel cell as a cathode gas.

* * * * *